United States Patent [19]

Dadhich

[11] Patent Number: 4,819,313
[45] Date of Patent: Apr. 11, 1989

[54] METHOD OF SALVAGING STATIONARY BLADES OF A STEAM TURBINE

[75] Inventor: Ghanshyam M. Dadhich, Orlando, Fla.

[73] Assignee: Westinghouse Electric Corp., Pittsburgh, Pa.

[21] Appl. No.: 201,715

[22] Filed: Jun. 3, 1988

[51] Int. Cl.[4] ................................................. B21K 3/00
[52] U.S. Cl. ............................ 29/156.8 R; 29/402.07; 29/402.08; 29/402.18; 29/426.4; 29/460; 29/527.4
[58] Field of Search ...................... 29/156.8 R, 402.07, 29/402.08, 402.18, 426.4, 445, 460, 527.1–530, 558, 156.4 R; 228/119

[56] References Cited

U.S. PATENT DOCUMENTS

| | | | |
|---|---|---|---|
| 952,317 | 3/1910 | Eyermann | 29/460 |
| 3,317,988 | 5/1967 | Endres | 29/460 X |
| 4,611,744 | 9/1986 | Fraser et al. | 29/402.18 X |
| 4,633,554 | 1/1987 | Clark et al. | 29/402.07 X |
| 4,726,104 | 2/1988 | Foster et al. | 228/119 X |
| 4,741,128 | 5/1988 | Reaves et al. | 29/156.8 R X |

Primary Examiner—Howard N. Goldberg
Assistant Examiner—Irene Cuda

[57] ABSTRACT

A method of salvaging stationary blades of a steam turbine cylinder includes tack welding abutting stationary blade platforms, cutting stationary blade roots out of the steam turbine cylinder, machining a side of the root and platform for each stationary blade to reduce thickness along the side and mounting the stationary blades in a new cylinder having mounting grooves for each row of stationary blades. Each mounting groove has an annular recess formed in a sidewall thereof and the cylinder has a sloping surface which faces a machined area of the root and platform of the stationary blades. The space between the sloped surface and the machined area provides access for a piece of caulking material and a caulking tool, whereby the caulking material is deformed to make a key connection between the cylinder and the stationary blade roots.

18 Claims, 4 Drawing Sheets

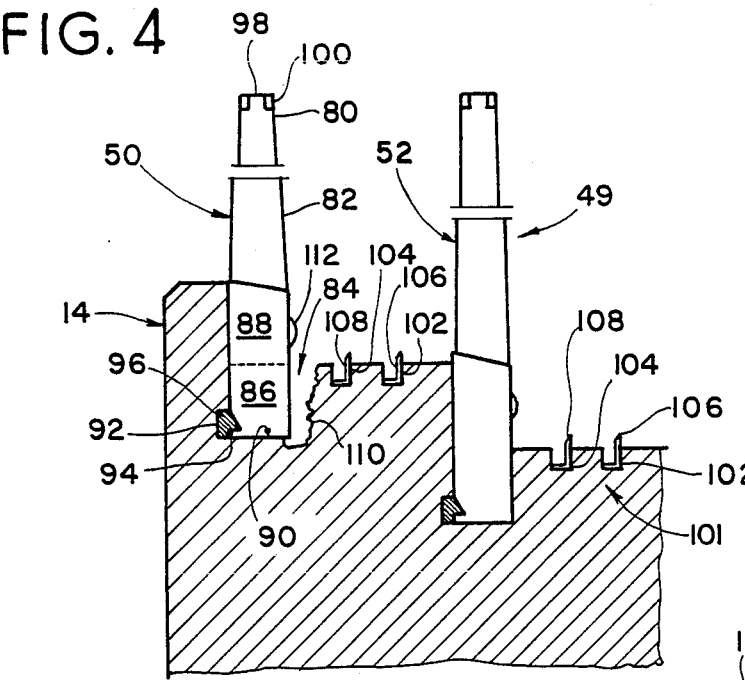

METHOD OF SALVAGING STATIONARY BLADES OF A STEAM TURBINE

BACKGROUND OF THE INVENTION

1. Field of the Invention

This invention relates generally to steam turbines and, more particularly, to a method of salvaging stationary blades of a steam turbine during replacement of a cylinder.

2. Description of the Related Art

A steam turbine power generating system usually includes a combination of low pressure, intermediate pressure, and/or high pressure steam turbines which are coupled together to provide a single power output. Each steam turbine includes a rotor having a plurality of rotating blades mounted thereon in rows with the blades of a given row being identical to each other. The rotating blades of a row extend radially outwardly from an outer surface of the rotor, with the rows being spaced apart in pairs on opposite sides of a transverse symmetry plane of the rotor. Since steam passes from the center of the rotor outwardly in opposite directions, the rotating blades of a row pair are substantially the same but oriented in opposite directions. The rotating blades of one row pair differ in shape from those of the other row pairs; most noticeably, the rotating blades of each row pair, or stage, become progressively longer as the distance along the rotor away from the transverse symmetry plane increases.

Each rotating blade, regardless of row, has an airfoil portion extending radially outwardly from the rotor and a base portion for mounting the blade to the rotor. The base portion includes a root which is fitted into an annular mounting groove provided for each row, and a platform at the proximal end of the airfoil portion. The airfoil portion has a tip at the distal end and has a twist profile from the proximal end to the distal end.

A stationary cylinder is coaxially supported around the rotor and has a plurality of stationary blades mounted on an inner surface thereof. The stationary blades are arranged in rows which, when the cylinder is assembled with the rotor, alternate with rows of rotating blades. The stationary blade rows are disposed axially along an inner surface of the cylinder in spaced apart pairs on opposite sides of a transverse symmetry plane of the cylinder which is coplanar with the transverse symmetry plane of the rotor. Like the rotating blades, the stationary blades of a row pair are substantially identical but oriented in opposite directions. The stationary blades of one row pair are shaped differently than those of the other rows, although all stationary blades have an airfoil portion and a base portion including a root and platform. The platforms of adjacent stationary blades of a row abut each other and the tips of the airfoil portions are shrouded together by a series of shrouds, each one usually interconnecting four or five stationary blades. The shrouded tips of the stationary blades are in contact with steam seals provided on the rotor between adjacent rotating blades. Similarly, tips of the rotating blades are in contact with steam seals provided on the cylinder between adjacent stationary blades.

The roots of the stationary blades of a row are mounted in an annular mounting groove provided in the cylinder. A typical annular mounting groove for a row of stationary blades has opposite side walls and a bottom wall. An annular recess is provided at the bottom wall, which extends axially into one of the side walls of the annular mounting groove. The root of each stationary blade is provided with a side notch which, when the root is fitted into the groove, aligns with the annular recess. The side notch and the annular recess together define a space which is common to both the cylinder and the root. When the space is filled with caulking material, the cylinder and root become keyed together. The caulking material is a soft metal which is applied with a caulking tool, such that as the stationary blades are fitted into the mounting grooves, a piece of caulking material is inserted into the space from an end of the root and then deformed to fill the space, thereby forming a key between the root and the cylinder. After caulking, the blades are shrouded together in groups.

The cylinder of every steam turbine is subjected to thermally induced stress which, over time, will degrade the condition of the cylinder to the point of requiring replacement. The presently employed maintenance procedure for replacing the cylinder involves separating the cylinder from the rotor, discarding the old cylinder along with the stationary blades connected thereto, and installing a new cylinder having new stationary blades. In order to facilitate assembly and disassembly, the cylinder is formed in two axially split halves which are bolted together. The maintenance procedure of replacing the cylinder, while not frequently required, is costly. Since one cylinder may have over 1,200 stationary blades, the cost of the stationary blades represents a substantial portion of the overall cost of a replacement cylinder. Usually when the cylinder needs replacement, the stationary blades are still in good condition.

SUMMARY OF THE INVENTION

An object of the invention is to remove stationary blades from an old cylinder and then reuse them in a new, replacement cylinder.

In a preferred embodiment of the invention, a method of salvaging stationary blades of a steam turbine cylinder coaxially disposed around a rotor having rotating blades fixedly connected thereto, wherein the stationary blades are arranged in a plurality of rows with each stationary blade of a row having a root, a platform and an airfoil portion, the stationary blades of a row being shrouded together at tips of the airfoil portions and being mounted by the roots in an annular groove provided in the cylinder for each row, the method comprising the steps of separating the cylinder from the rotor, connecting adjacent stationary blades within each row to each other near the roots, cutting the cylinder at an area around the root of each stationary blade, thereby disconnecting the stationary blades from the cylinder, and mounting the roots of the stationary blades in a new cylinder. Preferably, the connecting step comprises tack welding on a side of abutting platforms of the stationary blades of each row, thereby tying together abutting platforms with a tack weld. The new cylinder is provided with annular mounting grooves, each having an annular recess disposed in a sidewall of each annular mounting groove. The cylinder also has a sloping surface which converges near the annular recess of each mounting groove. The root and platform of each stationary blade are machined after separation from the old cylinder on a side opposite the tack welds to reduce the thickness of a portion of the root and platform and to form a shoulder spaced upwardly from a bottom of the root. Machining also produces a sloping surface spaced upwardly from the shoulder. A space between the sloping surface of the cylinder and the machined surfaces of each stationary blade provides access for inserting from the side a piece of caulking material and a caulking tool. The caulking tool deforms the caulking material to form a key between each blade root and the new cylinder.

These and other features and advantages of the method of salvaging stationary blades of the invention will become more apparent with reference to the following detailed description and drawings.

BRIEF DESCRIPTION OF THE DRAWINGS

FIG. 3a is an axial section of a portion of a row illustrated in FIG. 3.

FIG. 4 is a detailed, partial longitudinal cross-sectional view of the cylinder and first two rows of stationary blades shown in FIG. 3;

FIG. 5 is a detailed, longitudinal cross-sectional view of a portion of a replacement cylinder corresponding to the same portion as the original cylinder shown in FIG. 4;

DETAILED DESCRIPTION OF THE PREFERRED EMBODIMENTS

Figure 1:
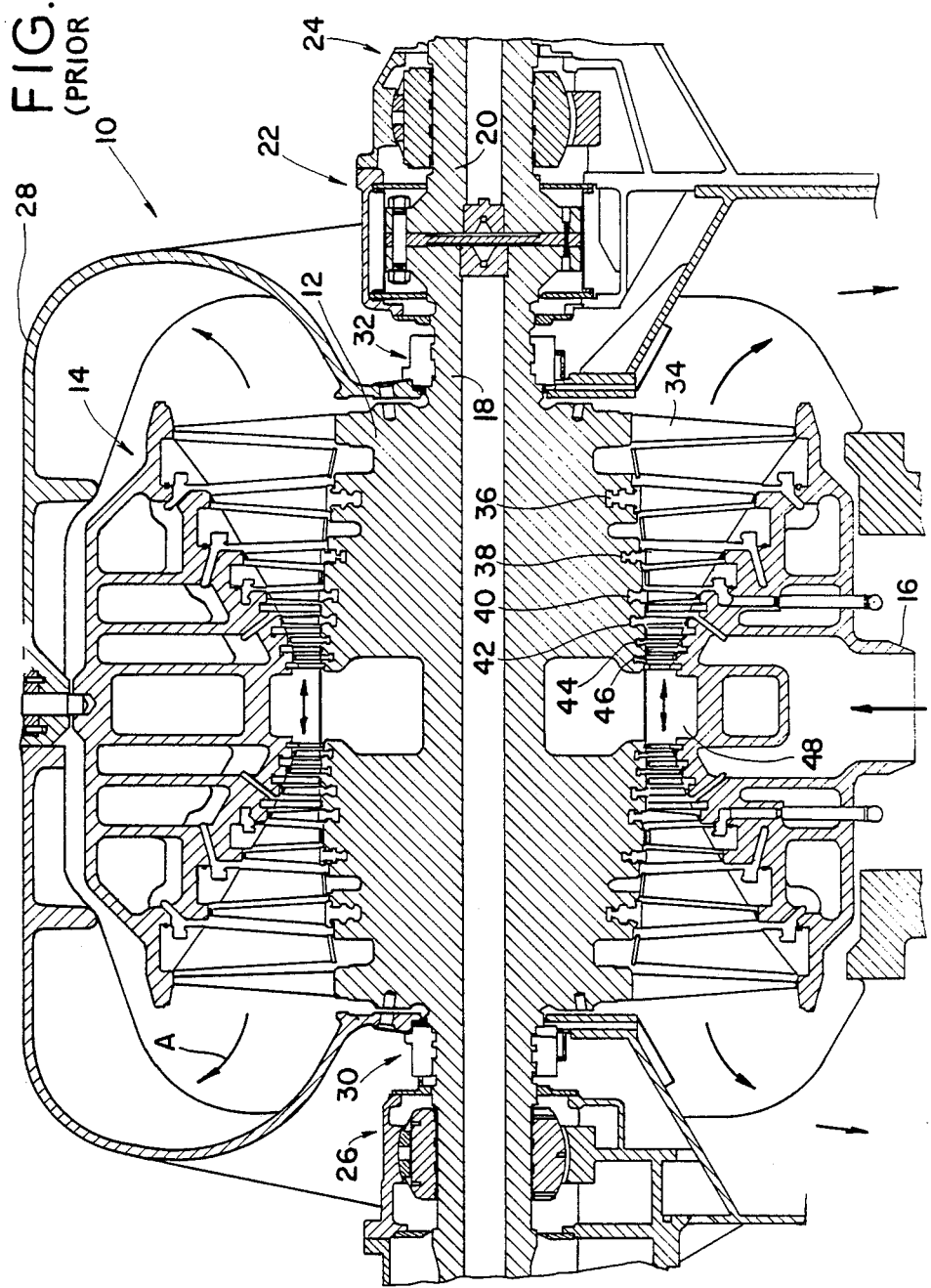
FIG. 1 is a partial longitudinal cross-sectional view of a known low pressure steam turbine upon which the method of the present invention may be employed.
Figure 2:
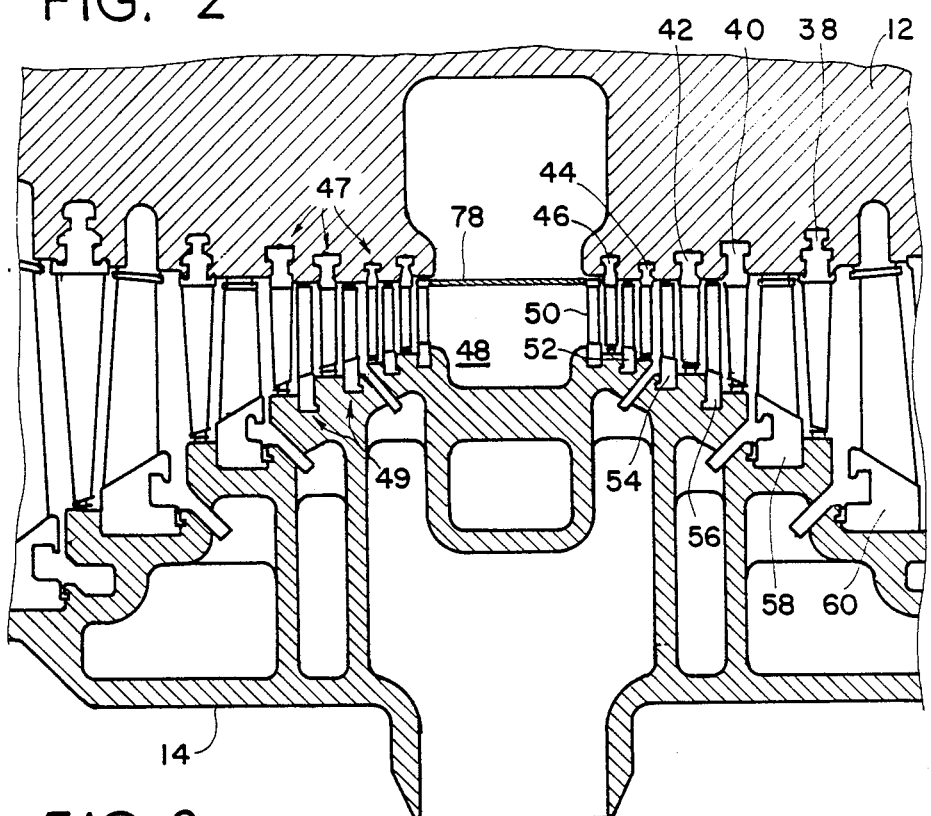
FIG. 2 is a detailed, partial longitudinal cross-sectional view of a portion of FIG. 1 showing alternating rows of rotating blades and stationary blades associated with the rotor and cylinder, respectively.

FIGS. 1 and 2 illustrate a known steam turbine 10 having a horizontally oriented rotor 18 which is coaxial with a cylinder 14. Steam enters the bottom 16 of cylinder 14 and passes through the center of the cylinder 14, outwardly to the sides, and downwardly to a condenser (not shown) according to the directional arrows A. The rotor 18 is coupled to an adjacent rotor 20 associated with another steam turbine (not shown). Steam turbine 10 is a low pressure turbine and the adjacent rotor 20 may be associated with an intermediate pressure turbine or a high pressure turbine. A coupling 22 is used to couple the rotor 18 to rotor 20. Bearings 24 and 26 support the rotor 12 for rotary movement. A casing 28 encircles the rotor 18 and cylinder 14 and directs steam to the condenser (not shown). Seals 30 and 32 are provided at opposite ends of the rotor 12 to prevent loss of steam.

Rotating blades 34, 36, 38, 40, 42, 44 and 46 are mounted to a mounting portion 12 of the rotor 18 in radially extending rows. All but blade 34 have roots mounted in grooves provided in the mounting portion 12. Rotating blades 34, 36, 38, 40, 42, 44 and 46 are paired with equivalent rows on the opposite side of inlet steam cavity 48. In the drawings, the rotor 18 and cylinder 14 are shown in cross-section but the blades are illustrated in elevational views. FIG. 2 is an enlarged view of the area around the inlet steam cavity 48 and illustrates how the rows 48 of rotating blades alternate with rows 49 of stationary blades.

Figure 3:
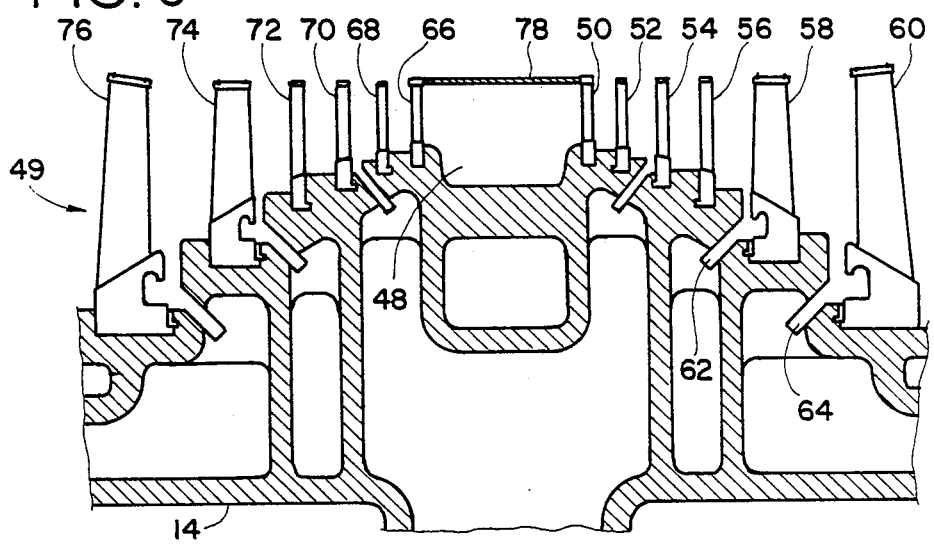
FIG. 3 is a partial longitudinal cross-sectional view of the cylinder and stationary blades of FIG. 2 separated from the rotor and rotating blades.

FIG. 3 shows the same cylinder portion and stationary blades as shown in FIG. 2, but with the rotor 18 and rotating blades removed. Separation of the cylinder 14 from the rotor 18 is made possible because the cylinder 14 is formed in two axially split halves which are joined together by fasteners (not shown). Although the cylinder 14 has a somewhat cylindrical outer shape, the inner surface has an hour glass shape to accommodate blades which increase in length as the distance from the inlet steam cavity 48 increases.

Stationary blades 50, 52, 54, and 56 have different types of base portions than the stationary blades 58 and 60 due to extraction passageways 62 and 64. Stationary blades 50, 52, 54, 56, 58, and 60 are paired with equal counterpart stationary blades 66, 68, 70, 72, 74, and 76, respectively. While all of the blades of a given row have tips shrouded together in groups, rows 49 of stationary blades 50 and 66 have a common shroud which also serves as a heat shield 78 and overlies the inlet steam cavity 48. It is understood that each blade illustrated in FIGS. 1–3 represents one blade for each row, within which there are from 70 to 95 similar blades. FIG. 3a illustrates a representative grouped segment 50a of stationary blades 50 in row 49. Platforms 88 of adjacent blades 50 abut one another, while tips 80 are shrouded together by a shroud 100.

FIG. 4 is a detailed cross-sectional view of stationary blades 50 and 52. Since all of the stationary blades have the same basic structure, a detailed reference is made only to stationary blade 50. Blade 50 has a base portion 84 and an airfoil portion 82 with a tip 80. Base portion 84 includes a root 86 and a platform 88 on which the airfoil portion 82 is supported. The root 86 is a part of the base portion 84 which is received in an annular mounting groove 90 provided in the cylinder 14. The platform 88 is integrally formed with the root 86 and extends outwardly above the groove 90, which has an annular recess 92. The root 86 is provided with a notch 94 which together with the annular recess 92 of the mounting groove 90 defines a space which is filled with caulking material 96 introduced from an end of the root 86 by means of a caulking tool (not shown). Caulking is performed when each stationary blade 50 of a row is fitted in the mounting groove 90. The caulking material 96 is a soft metal such as a mixture of lead and copper and can be deformed upon sufficient impact delivered by a conventional caulking tool. Once the caulking material 96 is deformed to fill the cavity, the root 86 becomes keyed to the cylinder 14.

The tip 80 of stationary blade 50 is provided with a shank 98 which is received in a hole provided in a shroud 100 after the blades of a row are mounted. Thereafter, the shroud 100 and shank 98 are interconnected by riveting, or other suitable means for interconnecting the two parts. Each shroud 100 is an arc section of an annular shroud assembly and connects to four stationary blade tips.

In FIG. 4, a pair of annular grooves 102 and 104 are provided in the surface of the cylinder 14 between adjacent rows 49 of stationary blades 50 and 52, as well as between all other adjacent stationary blades. Steam seals 106 and 108 for contacting a corresponding rotating blade of the rotor 18 are provided in the grooves 102 and 104, respectively.

Figure 6:
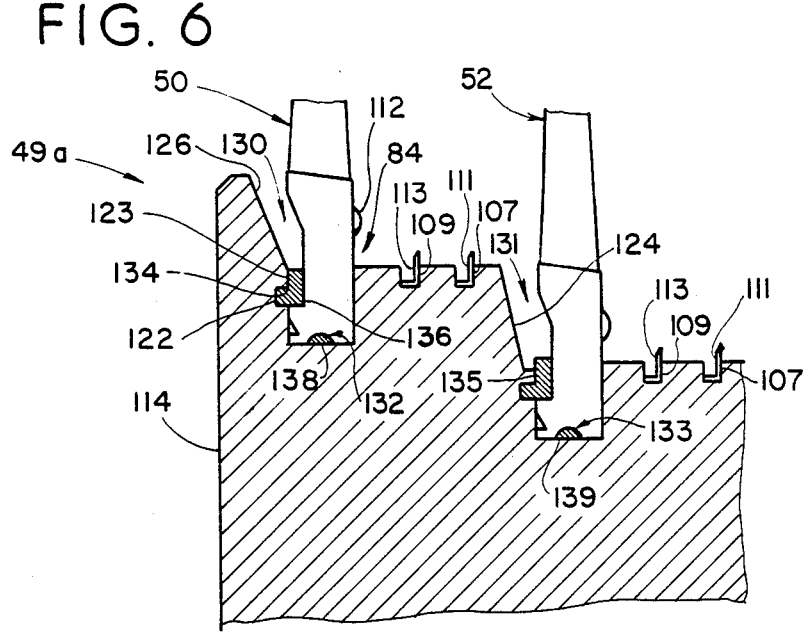
FIG. 6 is a detailed, partial longitudinal cross-sectional view of the cylinder portion shown in FIG. 5 after using the method of the present invention to salvage the stationary blades of the cylinder shown in FIG. 4.

In FIGS. 5 and 6, a similar pair of annular grooves 107 and 109 are provided in the surface of the new cylinder 114 between adjacent rows 49a of stationary blades. Steam seals 111 and 113 for contacting a corresponding rotor blade of the rotor 18 are provided in the grooves 107 and 109, respectively.

When replacement of the cylinder 14 is required, the steam turbine is disassembled and the cylinder 14 is separated into its two axially split halves, which are then separated from the rotor 18. The cylinder 14 is then cut around the root of each stationary blade to erode metal from the area 110 of the cylinder in order to remove the stationary blades from the cylinder. Removal of existing caulk may facilitate blade removal, although cutting of the cylinder 14 is the preferred method.

Due to the shrouding of the tips 80 of the stationary blades, a shrouded group of four or five stationary blades will tend to spring apart at the base portion 84 once separated from the cylinder 14, thus causing misalignment of the stationary blades. In the preferred method of the present invention, the base portion 84, and in particular the platform 88, of each blade of a shrouded group is tack welded to interconnect abutting platforms. As a result, the stationary blades of a particular group are interconnected at the platforms 88 by means of a tack weld 112, and at the tips 80 by means of the shrouds 100. The tack weld 112 is supplied by any of the various known tack welding techniques and is placed on the exposed side of two abutting platforms at a seam between the two. After tack welding, the cylinder 14 can be cut with a torch or otherwise eroded around the root 86 so that the stationary blades are separated from the cylinder 14.

A replacement or new cylinder 114, shown partially in FIG. 5, is substantially identical to the original cylinder 14, except in the area of the mounting grooves. Mounting grooves 116 and 118, are provided with annular recesses 120 and 122, respectively, at positions spaced upwardly from the bottoms 116a and 118a of the mounting grooves 116 and 118 and at one of the sidewalls 117 and 119 where sloping surfaces 124 and 126 are formed. Each of the sloping surfaces 124 and 126 is produced by machining away material corresponding to an area 128 shown in broken lines. The sloping sidewalls 124 and 126 are not necessary for the original cylinder and are specifically intended to facilitate re-caulking of the original stationary blades into the new cylinder 114

Referring now to FIG. 6, each of the blades 50 and 52 of the stationary blade rows are machined at the base portions at a side which faces the sloping surfaces 124 and 126 and which is opposite the tack welds so that together the sloping surfaces and the machined surfaces of the stationary blade base portions define passageways 130 and 131 for inserting a piece of caulking material from the side of each stationary blade and for inserting a caulking tool for deforming the caulking material from the side. Each stationary blade is further machined at the bottom of the root to form U-shaped annular recesses 132 and 133 which are filled with caulking material 138 and 139.

After machining the base portions 84 of the stationary blades of a given row, and after tack welding, each shrouded group of stationary blades of a given row is inserted into a corresponding cylinder mounting groove. Pieces of caulking material 134 and 135 are then inserted from the side through passageways 130 and 131 and deformed by a caulking tool so that the root of each blade of each row is keyed to the cylinder.

Figure 7:
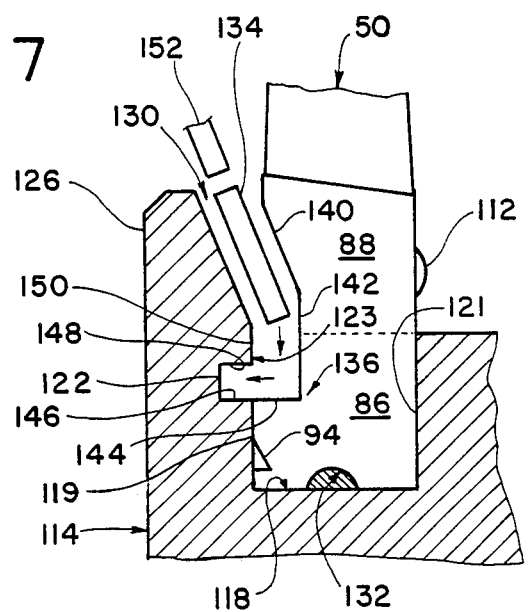
FIG. 7 is a detailed, partial cross-sectional view showing a caulking step of the present invention for caulking a stationary blade shown in FIG. 6.

FIG. 7 shows in greater detail the caulking steps and machined surfaces used to achieve the interconnection necessary for re-mounting the stationary blade root 86 of blade 50 in the new cylinder 114. The mounting groove 118 has opposite sidewalls 119 and 121 and a bottom wall 118a which coincide in shape to the sidewalls and bottom wall of the root 86, except for the notched portion 94 which now defines an empty space between the new cylinder 114 and root 86. The machining step performed on the stationary blade 50 involves removing a portion of the root 86 and platform 88 on a side thereof opposite the tack weld 112. Machining produces a sloped wall 140, a vertical wall 142 and a horizontal wall 144. Horizontal wall 144 is substantially coplanar with a sidewall 146 of the annular recess 122. The opposite sidewall 148 of annular recess 122 forms a step 123 with a vertical wall 150 of the cylinder 114. Vertical wall 142 and horizontal wall 144 of the root 86 and platform 88 form a shoulder 136 diagonally opposed to the shoulder 123 formed in the cylinder by the annular recess 122. The piece of caulking material 134 is inserted into the passageway 130 defined by the space between the sloping sidewall 126 of cylinder 114 and the machined surfaces 140, 142, and 144 on the side of root 86 and platform 88 of the stationary blade 50 and is driven downwardly by impact from a caulking tool 152. Any type of known caulking tool capable of fitting in the space and deforming the soft metal material can be employed. The caulking tool 152 drives the caulking material 134 downwardly in the direction of the arrows and radially outwardly into the annular recess 122. Eventually, the caulking material 134 adopts a substantially L-shape in cross-section, whereby the step 123 of the cylinder 114 and the shoulder 136 of the root 86 have an abutting interconnection through the L-shaped caulking material 134.

After caulking from the side with caulking tool 152, a second caulking step is performed by introducing caulking material from an end of the root 86 to fill the U-shaped recess 132. Caulking material (not shown in FIG. 7) in the area of 132 tends to tighten the previously established interconnection of the cylinder 144 and the root 86.

The procedures and structures described above for removing blade 50 and remounting the same to a new cylinder 114 apply equally to the removal and mounting of blade 52 except that the groove 116 which receives the root of blade 52 has a slightly different annular recess 120, as shown in the drawings. Slight variations are to be expected between the mounting grooves of different rows since the stationary blades differ from row to row, although the mounting groove for blade 50 would be identical to the mounting groove of corresponding stationary blade 66 (see FIG. 3). The only requirement is that each mounting groove have an annular recess, such as annular recess 120, to form a step spaced from the bottom of the mounting groove, and the root 86 of the stationary blade must be machined to form a shoulder so that a piece of caulking material can fill a space between the step and shoulder and thereby effect an abutting step and shoulder keyed interconnection between the cylinder 114 and the stationary blade root 86.

It should be understood that since the stationary blades are shrouded together in groups, the piece of caulking material 134 would have a radial length necessary to caulk along the sides of four shrouded together stationary blades, although separate successive pieces of caulking material could also be employed end-to-end. Caulking material to fill in U-shaped recess 132 is placed in the recess from an end of the last stationary blade in a shrouded group. The caulking tool is then inserted into the U-shaped recess of the last shrouded stationary blade to drive the caulking material and deform the same as necessary.

After mounting all of the stationary blades from the old cylinder in the new cylinder, the tackwelds are left on the platforms of the adjacent stationary blades since they have no noticeable adverse affect on performance. Placement of the tack welds should be away from the airfoil portion of each blade so that heat from tack welding does not affect the airfoil surface. Placement at approximately the midpoint between the root and the airfoil portion on the platform is preferred.

Numerous modifications and adaptations of the method of salvaging stationary blades of the present invention will be apparent to those so skilled in the art and thus, it is intended by the following claims to cover all such modifications and adaptations which fall within the true spirit and scope of the invention.

What is claimed is:

1. A method of salvaging stationary blades of a steam turbine cylinder coaxially disposed around a rotor, wherein the stationary blades are arranged in a plurality of rows with each stationary blade of a row having a root, a platform and an airfoil portion, the stationary blades of a row being shrouded together in groups at the tips of the airfoil portions and being mounted by the roots in an annular groove provided in the cylinder for each row, said method comprising the steps of:
   separating the cylinder from the rotor;
   connecting adjacent stationary blades of a shrouded group within each row near the roots;
   cutting the cylinder at an area adjacent to the root of each stationary blade of each row to disconnect the stationary blades from the cylinder; and
   mounting the roots of the stationary blades in a new cylinder.

2. A method of savaging stationary blades as recited in claim 1, wherein adjacent stationary blades of a row have abutting platforms, and wherein said connecting step comprises:
   tack welding the abutting platforms of adjacent stationary blades of a shrouded group to each other.

3. A method of salvaging stationary blades as recited in claim 2, wherein said tack welding step comprises:
   tack welding the adjacent stationary blades of a group together at the platforms.

4. A method of salvaging stationary blades as recited in claim 2, further comprising a step of:
   forming annular mounting grooves, for each row of stationary blades in the new cylinder with each annular mounting groove having two opposite sidewalls, and a bottom wall and an annular recess formed in one of the two sidewalls.

5. A method of salvaging stationary blades as recited in claim 4, further comprising a step of:
   forming sloping surfaces above the annular recess of each annular mounting groove.

6. A method of salvaging stationary blades as recited in claim 5, further comprising a step of:
   machining a side of the root and platform of each stationary blade of a row to reduce thickness, wherein a shoulder is formed in the root at a point spaced from a bottom of the root.

7. A method of salvaging stationary blades as recited in claim 6, wherein said machining step further comprises:
   machining a horizontal surface along the root and platform of each blade and a vertical surface at a lower end of the horizontal surface in the root.

8. A method of salvaging stationary blades as recited in claim 7, wherein said step of forming an annular groove further comprises:
   spacing the annular recess of each annular mounting groove upwardly from the bottom wall of the annular mounting groove, each annular recess having a lower sidewall, an upper sidewall and a bottom wall, wherein the horizontal machined surface of the root is substantially coplanar with the lower sidewall of the annular recess.

9. A method of salvaging stationary blades as recited in claim 8, wherein said step of mounting the roots of the stationary blades comprises:
   fitting the roots of a shrouded group of stationary blades into a corresponding annular mounting groove, and
   caulking between the machined surface of the root and the cylinder.

10. A method of salvaging stationary blades as recited in claim 9, wherein said caulking step comprises:
    placing a piece of caulking material between each sloping surface of the cylinder and the machined surfaces of each stationary blade, and
    driving the caulking material downwardly and into the annular recess thereby forming a key between the cylinder and the stationary blade roots.

11. A method of salvaging stationary blades as recited in claim 10, further comprising a step of:
    machining a bottom of each stationary blade root to form an axial recess before placing the stationary blade roots in the mounting groove, and
    inserting a second piece of caulking material into the axial recess after fitting the stationary blade roots in the mounting groove and after caulking, and driving the second piece of caulking material inwardly with a caulking tool.

12. A method of salvaging stationary blades of a steam turbine cylinder coaxially disposed around a rotor, wherein the stationary blades are arranged in a plurality of rows, each stationary blade of a given row having a root receivable in an annular mounting groove provided in the cylinder for each row, a platform formed on a distal end of the root, and an airfoil extending upwardly from the platform and having a tip at a distal end thereof, the stationary blades of a given row being shrouded together in groups at the airfoil tips, the method comprising the steps of:
    separating the cylinder from the rotor;
    connecting abutting platforms of adjacent blades of each shrouded group by tack welding a radially outer side of the abutting platforms of the adjacent stationary blades of a group to tie together adjacent stationary blades through a tack weld;
    cutting the cylinder adjacent the root of each stationary blade to disconnect the stationary blades from the cylinder; and
    mounting the roots of the stationary blades in a new cylinder having annular grooves for mounting corresponding rows of stationary blades, wherein each annular mounting groove has opposite sidewalls and a bottom wall and an annular recess in one of the sidewalls spaced upwardly from the bottom wall of the groove.

13. A method of salvaging stationary blades as recited in claim 12, further comprising the step of:
   forming a sloping surface in the cylinder above the sidewall of each annular groove having the annular recess disposed therein.

14. A method of salvaging stationary blades as recited in claim 13, further comprising the step of:
   machining each stationary blade to reduce thickness of a portion of the root and platform, thereby forming machined surfaces.

15. A method of salvaging stationary blades as recited in claim 14, wherein said mounting step comprises the steps of:
   fitting the machined stationary blades in corresponding annular mounting grooves of the new cylinder; and
   caulking the area between the machined portion of the root and platform and the annular recess, thereby keying the stationary blade roots to the new cylinder.

16. A method of salvaging stationary blades as recited in claim 15, wherein said caulking step comprises the steps of:
   placing a piece of caulking material between the machined surfaces of the root and platform, and the sloping surface of the cylinder; and
   deforming the caulking material with a caulking tool to form a step and shoulder abutting connection between the new cylinder and each blade root.

17. A method of salvaging stationary blades as recited in claim 16, wherein said mounting step further comprises the steps of:
   machining each stationary blade to form an axial recess at a bottom of each root; and
   caulking each axial recess.

18. A method of salvaging stationary blades as recited in claim 17, wherein said caulking step comprises:
   filling the annular recess of each annular mounting groove and the axial recess of the root with caulking material.

* * * * *